United States Patent [19]

Lee

[11] Patent Number: 4,779,497
[45] Date of Patent: Oct. 25, 1988

[54] DEVICE AND METHOD OF CUTTING OFF A PORTION OF MASKING FILM ADHERED TO A SILICON WAFER

[75] Inventor: Masahiro Lee, Sakai, Japan

[73] Assignee: Teikoku Seiki Kabushiki Kaisha, Osaka, Japan

[21] Appl. No.: 6,193

[22] Filed: Jan. 23, 1987

[51] Int. Cl.⁴ .................. B23B 1/00; B23B 5/00; B26F 3/12
[52] U.S. Cl. .................................... 83/16; 82/51; 83/27; 83/109; 83/171; 83/651.1; 83/733; 83/734; 156/267
[58] Field of Search ............... 83/13, 16, 27, 171, 83/651.1, 411 R, 733, 734, 102.1, 102, 78, 109; 82/47, 51; 156/267, 334

[56] References Cited

U.S. PATENT DOCUMENTS

| | | | |
|---|---|---|---|
| 3,677,118 | 7/1972 | Abbott et al. | 83/411 R |
| 4,018,117 | 4/1977 | Patterson | 8/171 |
| 4,063,609 | 8/1986 | Takatoshi | 83/171 |
| 4,494,523 | 1/1985 | Wells | 83/651.1 |
| 4,522,679 | 6/1985 | Funakoshi et al. | 156/267 |

FOREIGN PATENT DOCUMENTS 865535 9/1981 U.S.S.R. .................. 82/51

Primary Examiner—E. R. Kazenske
Assistant Examiner—Hien H. Phan
Attorney, Agent, or Firm—Edwin E. Greigg

[57] ABSTRACT

A method of cutting off a masking film of a silicon wafer comprising the steps of rotating the silicon wafer, feeding a heat wire continuously to the outer periphery of the silicon wafer and cutting off the outer periphery of the masking film along the outer perphery of the silicon wafer.

8 Claims, 4 Drawing Sheets

DEVICE AND METHOD OF CUTTING OFF A PORTION OF MASKING FILM ADHERED TO A SILICON WAFER

BACKGROUND OF THE INVENTION

This invention relates to a method of cutting off a masking film of a silicon wafer, and particularly to the method of cutting off the masking film automatically long the outer periphery of the silicon wafer to which the masking film was adhered before lapping or cutting the reverse side of the silicon wafer, which is, for instance, used for an IC, an LSI or a VLSI. In the case of the so-called IC manufacturing process, this method may be utilized generally in the crystalizing process including the slicing, lapping, polishing or back-grinding step.

The IC manufacturing process may be divided into the steps of the crystalizing process, the pre-wafer process, the after-wafer process and the checking process. In the crystalizing process, the slicing, lapping and polishing or back-grinding steps are carried out after crystalization of the silicon. The lapping step is aimed at removing the strained layer, which is made in the slicing step, from the surface of the silicon crystal, and also at thinning the sliced thick crystal (wafer) to a predetermined thickness and finishing the sliced surface to be a mirror finish for electric circuit formation. It is necessary that high precision be used on the lapped surface to provide flatness and smoothness.

Nowadays, in view of IC packaging, it becomes general to take a process for making a wafer thinner after the wafer forming process in order to fulfil the requirements in packaging and to solve a heat problem as well as shortening of the size of the IC chip. In the case of a CMOS and the like which normally heat less, of course, it is not necessary to thin the wafer, but it becomes necessary to thin same in order to minimize the package therefor. In the process of thinning the wafer, the reverse side of the wafer is cut and it is, of course, necessary to have a lapping or back-grinding step.

Prior to the lapping stage, the silicon wafer is waxed with its circuit face and fixed onto an internal gear table so as to lap the reverse side thereof or a masking film (for instance a laminate) is stuck to the circuit face of the silicon wafer so as to be fixed with suction force for lapping the reverse side thereof. This operation aims at protecting the circuit face of the silicon wafer in lapping, etching or backgrinding step. However, such waxing or sticking of the masking film is carried out manually. Particularly, it relies on a manual operation to cut off the outer periphery of the masking film, which extends from the silicon wafer, along the outer periphery of the silicon wafer.

According to the conventional method of waxing a silicon wafer, there are considerable disadvantages as well as being troublesome and inefficient. On the other hand, it has the same disadvantages in the method of sticking of the masking film since it is carried out manually.

Particularly, the conventional method involves not only inefficiency in the operation to cut off the masking film along the outer periphery of the silicon wafer which has to be carried out by a skilled worker, but also a disadvantage in yield rate. Namely, since the outer portion of the masking film is manually cut along the outer periphery of the silicon wafer by means of a cutter, even the skilled worker applies uneven and unnecessary pressure to the outer periphery of the silicon wafer. As the result, edge chips are made around the outer periphery so that yield rate becomes low and it is difficult to avoid mistakes and damage to the wafer. Further, when the outer periphery of the masking film is cut off, there sometimes remain chips (so-called whiskers) around the cutting section of the masking film though it would be better that the cutting section of the masking film becomes even or clean. In this case, the securing device forms the whiskers in lapping process and as the result the very expensive silicon wafer is damaged and it sometimes brings about that the diamond securing means of a lapping machine is also broken.

It is of course desirable to automate such manual cutting of the masking film, but therein lies the following problems:

(1) It cannot be avoided that accuracy of the outer diameter of the silicon wafer is beyond ±0.5 to a standard per each lot of the silicon wafers;

(2) the number of the positioning flats is one or two, but not constant depending on the type of the machine or the size of the wafer;

(3) there occurs edge chips with the wafers at a considerable percentage prior to adhesion of the masking film; and (4) it is preferable to cut the wafer along the outer periphery of the wafer and therefor the above-mentioned problems 1, 2 and 3 have to be solved.

OBJECT AND SUMMARY OF THE INVENTION

This invention has an object to solve the disadvantages of the above-mentioned prior art. To achieve this object, the method of cutting off a masking film of a silicon wafer according to this invention comprises the steps of rotating the silicon wafer to which the masking film is adhered, feeding a heated wire continuously to the outer periphery of the silicon wafer to contact same, and cutting off the outer periphery of the masking film along the outer periphery of the silicon wafer.

In the method of cutting off the outer portion of the masking film, which is stuck to the silicon wafer, along the outer periphery of the silicon wafer, the heated wire is utilized for cutting the outer portion of the masking film with heat in such a manner that the heated wire is fed continuously to the silicon wafer at a suitable angle and with an appropriate tension force so as to contact the outer periphery of the silicon wafers. As a result, unnecessary external pressure may not be given to the outer periphery of the silicon wafer. Also, uneven or irregular sections such as whiskers do not occur around the cutting sections of the masking film. Furthermore, it may be smoothly carried out to cut the wafers although a small number of edge chips may be made.

Therefore, according to this invention, the method of cutting the masking film of the silicon wafer, which was once carried out manually by the skilled worker, has been automated to have the following advantages:

(1) Productivity increases substantially by the reason of the operating speed remarkably increasing and that the method may apply for any kind of silicon wafers having different outer diameters or shapes.

(2) personnel expenses can be lowered;

(3) yield rate of the silicon wafers (chips) can be increased to almost 100%;

(4) the cutting method of this invention by use of the heated wire produces no dust though the cutting is, of course, carried out in a completely clean room. This means that the chips are not damaged. Further, it is sufficient to heat the wire at the low temperature necessary for cutting the masking film and therefore the cutting can be carried out without producing smoke; and (5) durability of the expensive grip provided with a lapping machine can be increased.

Other objects and advantages of this invention will be apparent from the following description.

DETAILED DESCRIPTION OF THE PREFERRED EMBODIMENT

Figure 1:
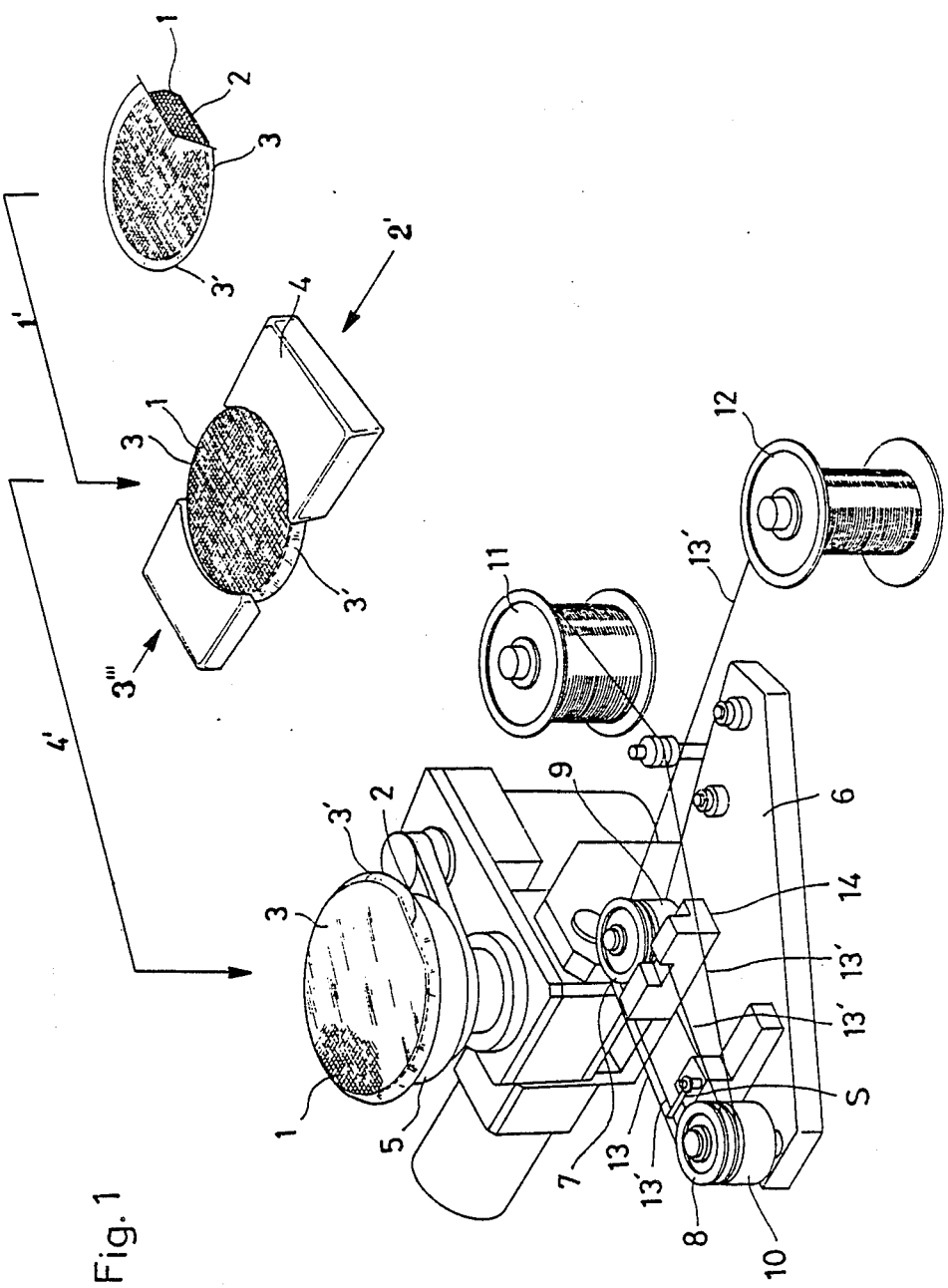
FIG. 1 is a perspective view showing the stage prior to practicing the method of this invention.

FIG. 1 is a view showing the stage prior to practicing the method of this invention. A masking film 3 is made to adhere to a circuit surface of a silicon wafer 1. On this stage, the masking film 3 has an outer diameter larger than that of the silicon wafer 1, and so forms an outer film portion 3'. In the state, when the silicon wafer 1 is moved in a direction as shown by an arrow 1', jaws 4 are movable in the direction of arrows 2', 3''' to secure the silicon wafer 1 from opposite sides thereof so as to fix its position and then the assembly is moved in a direction as shown by an arrow 4' so that the silicon wafer 1 may be set on a turntable 5 and fixed in place with a vacuum force.

Figure 2:
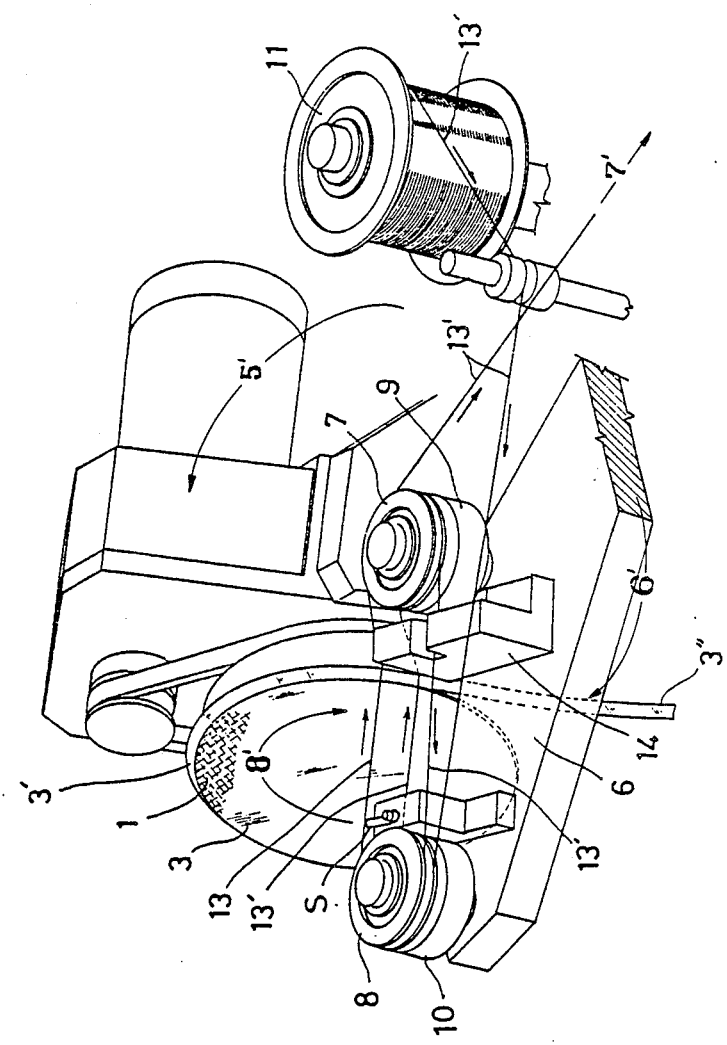
FIG. 2 is a view showing the silicon wafer moved into an operative position.

Next, FIG. 2 shows a view of an essential portion of an apparatus for practicing the method of this invention. Following the arrow 4' in FIG. 1, the jaws 4 and the turntable 5 rotate about 90 degrees as shown by an arrow 5' so that the silicon wafer may be in a standing vertical posture. On the other hand, a conductive pulley 7 and a non-conductive pulley 9 which are formed integrally, and a conductive pulley 8 and a non-conductive pulley 10 which are also formed integrally, are pivotally connected on a swing plate 6. An unheated wire 13' is fed from a wire bobbin 11 and contacts the outer periphery of the silicon wafer between the non-conductive pulley 10 according to an arrow 8' shown in FIG. 2 and the non-conductive pulley 9 so as to separate the cut surface of the outer film portion 3' from the masking film 3 and to clean the cut surface. Thereafter, the unheated wire 13' is arranged so that the portion between the conductive pulley 8 and the conductive pulley 7 is heated so as to heat and cut the outer film portion 3' and then moved in a direction of an arrow 7' to be wound on a wire bobbin 11. The swing plate 6 rotates slightly in a direction of an arrow 6' and moves until the wires 13 and 13' contact the outer periphery of the silicon wafer 1, when the silicon wafer is in a standing vertical posture.

Figure 3:
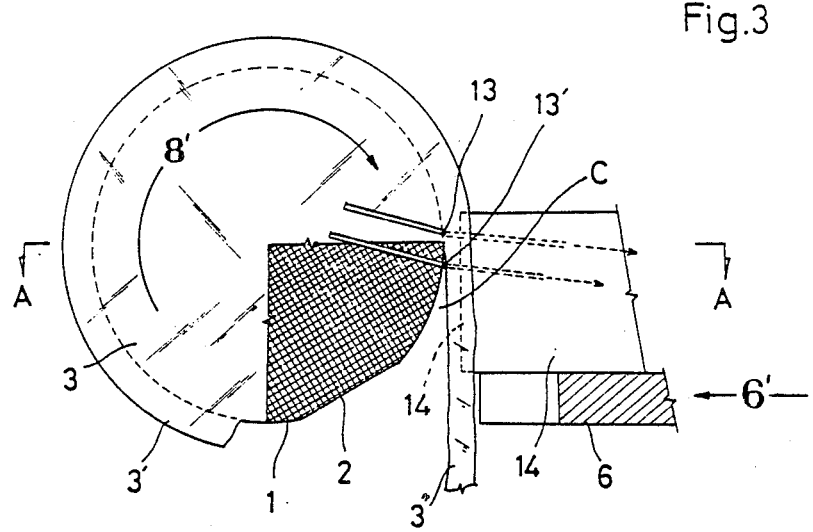
FIG. 3 is an enlarged view showing the essential portion.

FIG. 3 shows an enlarged view of the essential portion of the apparatus for practicing the method of this invention. The silicon wafer 1 rotates in a direction of an arrow 8' as the jaws 4 and the turntable 5 rotate. Since the swing plate 6 approaches the outer periphery of the rotating silicon wafer 1 in a direction of an arrow 6', the heated wire 13 (heater) may contact the outer periphery of the silicon wafer 1 so as to cut off the outer film portion 3' of the masking film 3 and then the non-conductive wire 13' (dummy wire) beneath the conductive wire 13 also contacts the cut surface of the masking film 3 so that the cut outer film portion 3' and lumps of the film which are formed with heat or dust may be separated completely from the silicon wafer 1. A cut waste film 3'' falls down. It is sufficient to heat the conductive wire 13 at the low temperature necessary for cutting.

Figure 4:
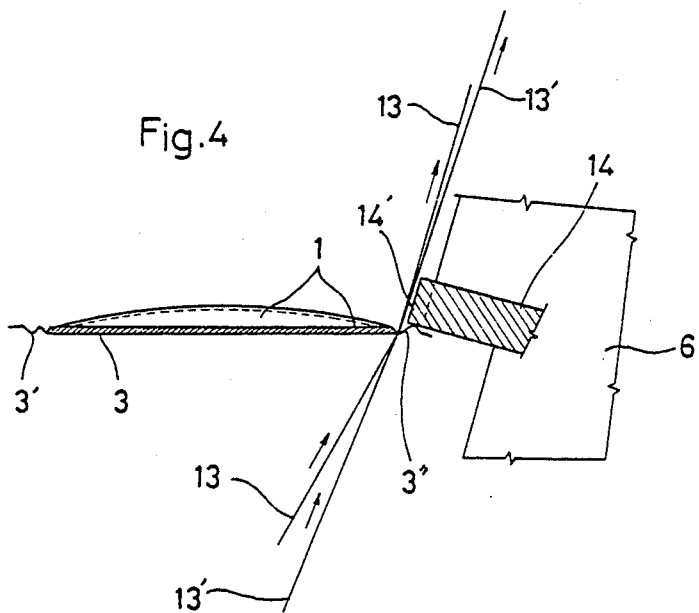
FIG. 4 is a sectional plan view taken along A—A of the essential portion.

FIG. 4 is a sectional plan view taken along A—A of the essential portion of th apparatus for practicing the method of this invention. The angle formed by crossing the conductive wire 13 and the non-conductive wire 13' over the silicon wafer 1 is less than 90 degrees relative to the axis of the wafer, but the outer periphery of the silicon wafer 1 forms an angle wider than a right angle with respect to a direction of movement of the wire. Namely, according to FIG. 4, the silicon wafer 1 which is slightly inclined on this side, rotates clockwise and the conductive heated wire portion 13 and the non-conductive unheaded wire portion 13' move from the bottom to the top to make a slope as shown in FIG. 3 so that the cut surface may be formed more smoothly. The conductive heated wire portion 13 and the non-conductive unheated wire 13' are tensed slightly and the swing plate 6 is urged in a direction of the arrow 6' in FIG. 3 and therefore tension is given to the contact between the flat 2 for setting the position of the silicon wafer 1 and the conductive wire 13 and the non-conductive unheated wire 13'.

Figure 5:
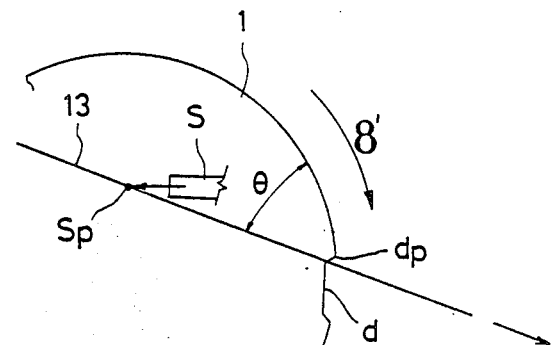
FIGS. 5 and 6 are views each showing the edge chips of the silicon wafer formed on the periphery thereof and the state of contacting the wire with the silicon wafer.
Figure 6:
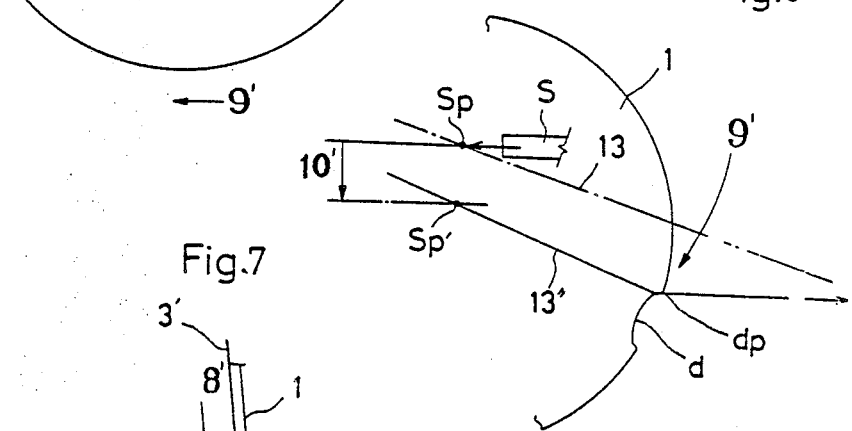
Figure 7:
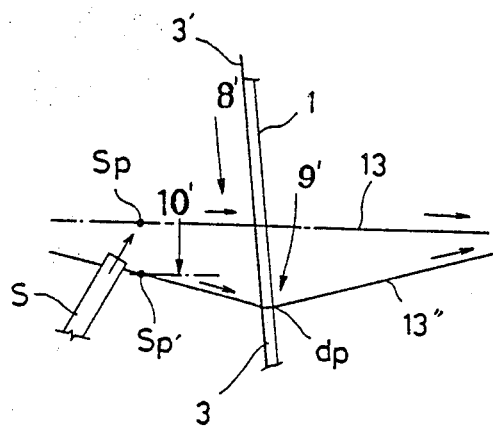
FIG. 7 is a side view of FIG. 6.

FIGS. 5 and 6 are front views which show the edge chips of the silicon wafer 1 and the contact state of the conductive heated wire portion 13. FIG. 7 is a side view of FIG. 6. There is set a position detecting point Sp with the conductive heated wire portion 13 by means of a sensor S. Therefore, in the event that the silicon wafer 1 has edge chips d, where a dead point dp is an obtuse angle, the conductive heated wire portion 13 may pass through the edge chips. However, where the dead point dp is an acute angle (in order words there is an edge chip of an acute angle), the conductive heated wire portion 13 is hooked at the dead point dp and as it moves in a direction of an arrow 9', the position detecting point Sp changes to a Sp'. By detecting the point Sp' by means of the sensor S, the apparatus is automatically stopped so that it may prevent heavy damage of the silicon wafer 1 or cutting of the wire. For instance, a safety block 14' of a guide block 14 in FIG. 4, which is coated with Teflon, causes the cut waste film 3'' to fall away.

Thus the masking film 3 of the silicon wafer 1 may be cut off automatically and precisely.

I claim:

1. A method of cutting off a portion of a masking film adhered to a silicon wafer comprising the steps of:
    rotating the silicon wafer to which the masking film is adhered,
    feeding a heated wire portion continuously to the outer periphery of the silicon wafer to contact same,
    cutting off the outer periphery of the masking film along the outer periphery of the silicon wafer during rotation of the silicon wafer and movement of said heated wire, and feeding an unheated wire portion continuously toward the cut portion of the outer periphery of the masking film along an edge of the silicon wafer to insure separation of the cut waste portion of the masking film from the silicon wafer.

2. The method of claim 1 which includes positioning said heated wire portion and said unheated wire portion to cross the silicon wafer at an angle less than 90 degrees relative to its rotating axis during separation of said masking film from the silicon wafer.

3. The method of claim 2 wherein the heated wire portion is made of electric conductive material.

4. The method of claim 1 wherein the heated wire portion is made of electric conductive material.

5. A device for cutting off a masking film of a silicon wafer to which the masking film is adhered comprising:

means for rotating the silicon wafer to which the masking film is adhered, means for feeding a heated wire portion continuously to the outer periphery of the silicon wafer to contact same, means for cutting off the outer periphery of the masking film along the outer periphery of the silicon wafer, and means for feeding an unheated wire portion continuously toward the cut portion of the outer periphery of the silicon wafer to insure separation of the cut waste portion of the masking film from the silicon wafer.

6. A device as set forth in claim 5 which includes positioning said heated wire portion and said unheated wire to cross the silicon wafer at an angle less than 90 degrees relative to its rotating axis during separation of said masking film from the silicon wafer.

7. A device as set forth in claim 6 wherein the heated wire portion is made of electric conductive material.

8. A device as set forth in claim 5 wherein the heated wire portion is made of electric conductive material.

* * * * *